(12) United States Patent
Venkata et al.

(10) Patent No.: US 7,436,210 B2
(45) Date of Patent: *Oct. 14, 2008

(54) NEXT GENERATION 8B10B ARCHITECTURE

(75) Inventors: Ramanand Venkata, San Jose, CA (US); Rakesh H Patel, Cupertino, CA (US); Chong H Lee, San Ramon, CA (US)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/655,797

(22) Filed: Jan. 18, 2007

(65) Prior Publication Data

US 2007/0139232 A1      Jun. 21, 2007

Related U.S. Application Data

(63) Continuation of application No. 10/977,952, filed on Oct. 29, 2004, now Pat. No. 7,183,797.

(51) Int. Cl.
*H03K 19/173* (2006.01)
(52) U.S. Cl. .......................................... 326/38; 326/41
(58) Field of Classification Search ............... 326/37–41
See application file for complete search history.

(56) References Cited

U.S. PATENT DOCUMENTS 4,486,739 A     12/1984  Franaszek et al.
6,606,328 B1 *  8/2003   Susnow ....................... 370/465
6,628,140 B2    9/2003   Langhammer et al.
6,650,140 B2 *  11/2003  Lee et al. ....................... 326/39
6,653,957 B1 *  11/2003  Patterson et al. ............. 341/100
6,700,510 B1    3/2004   Kryzak et al.
6,812,870 B1    11/2004  Kryzak et al.
7,183,797 B2 *  2/2007   Venkata et al. ................. 326/38

OTHER PUBLICATIONS

Altera Corporation, "8B10B Encoder/Decoder: MegaCore Function User Guide," MegaCore Version 1.4.0, Document Version 1.4.0 Rev. 1, Feb. 2004.

* cited by examiner

*Primary Examiner*—Don P Le
(74) *Attorney, Agent, or Firm*—Ropes & Gray LLP; Robert R. Jackson; Chia-Hao La (57)  ABSTRACT

Eight-bit ten-bit (8B10B) coding is provided in a hard intellectual property (IP) block with the capability of supporting a greater range of data rates (e.g., data rates less than, equal to, and greater than 3.125 Gbps). Each channel of high speed serial interface circuitry includes receiver circuitry having two 8B10B decoders and transmitter circuitry having two 8B10B encoders. The receiver and transmitter circuitry can be configured to operate in one of three modes of operation: cascade mode, dual channel mode, and single channel mode.

20 Claims, 12 Drawing Sheets

TX CIRCUITRY

FIG. 12

NEXT GENERATION 8B10B ARCHITECTURE

CROSS-REFERENCE TO RELATED APPLICATION

This application is a continuation of U.S. patent application Ser. No. 10/977,952, filed Oct. 29, 2004, which is hereby incorporated by reference herein in its entirety.

BACKGROUND OF THE INVENTION

This invention relates to eight-bit ten-bit (8B10B) coding. More particularly, this invention relates to 8B10B coding for high-speed data rates.

Programmable logic device (PLD) technology is well known for its ability to allow a common hardware design (embodied in an integrated circuit) to be programmed to meet the needs of many different applications. To facilitate the use of PLDs in certain applications, intellectual property (IP) blocks are coupled to PLD core circuitry. In one application, an IP block is a block of logic or data that supports a multi-channel communications protocol such as high speed serial interface (HSSI) communications. HSSI communications include industry standards such as, for example, Serial Rapid I/O and PCI-Express. In a multi-channel communications protocol, data transfers to and from the PLD core circuitry and the IP block over multiple channels.

Such HSSI communications use 8B10B coding, which advantageously provides direct current (DC) balance and limited run length. DC balance means that the number of binary "1s" is equal to the number of binary "0s" transmitted along the data path. This ensures that the output voltage at the serial buffers does not deviate too much towards either the source voltage or ground voltage. Limited run length means that the number of consecutive binary "1s" and "0s" transmitted is limited to, for example, five. This facilitates the receiving chip in locking to the incoming data.

Current 8B10B coding technology has the capability of processing transmitted data at speeds of up to 3.125 gigabits per second (Gbps). However, with advances in technology, protocols are being developed that support even higher data rates (e.g., data rates greater than 3.125 Gbps, for example, 6.5 Gbps).

Current 8B10B coding is known to be implemented in soft IP. Architecture that is implemented in soft IP occupies a larger area compared to the architecture being implemented in hard IP.

In view of the foregoing, it would be desirable to provide 8B10B coding in hard IP with the capability of supporting a greater range of data rates (e.g., data rates less than, equal to, and greater than 3.125 Gbps).

SUMMARY OF THE INVENTION

In accordance with the invention, eight-bit ten-bit (8B10B) coding is provided in a hard intellectual property (IP) block with the capability of supporting a greater range of data rates (e.g., data rates less than, equal to, and greater than 3.125 Gbps).

In accordance with the invention, HSSI circuitry is provided in a hard IP block that supports data rates up to 6.5 Gbps. Each channel of the HSSI circuitry can include receiver circuitry that supports two 8B10B decoders and transmitter circuitry that supports two 8B10B encoders. Control signals can be provided (e.g., using dynamic or static configuration random access memory) to allow the receiver and/or transmitter circuitry to be configured to process the data. The two 8B10B decoders and encoders can be coupled in such a way as to allow the respective receiver and transmitter circuitry to be configured to operate in one of three modes of operation: cascade mode, dual channel mode, and single channel mode.

Each channel can support data rates greater than 3.125 Gbps and up to 6.5 Gbps using the cascade mode or dual channel mode. In the cascade mode, the output of each decoder or encoder is sent as input to the other decoder or encoder, allowing the data signals to interact with each other. In this mode, the characteristics of 8B10B coding, including DC balance and run length, are maintained. In the dual channel mode, each decoder or encoder processes data signals independently of the other decoder or encoder. In this mode, some of the characteristics of 8B10B coding, for example, run length, are not maintained.

Each channel can support data rates less than or equal to 3.125 Gbps using the single channel mode. In the single channel mode, only one decoder or encoder is used. In this mode, the characteristics of 8B10B coding, including DC balance and run length, are maintained.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
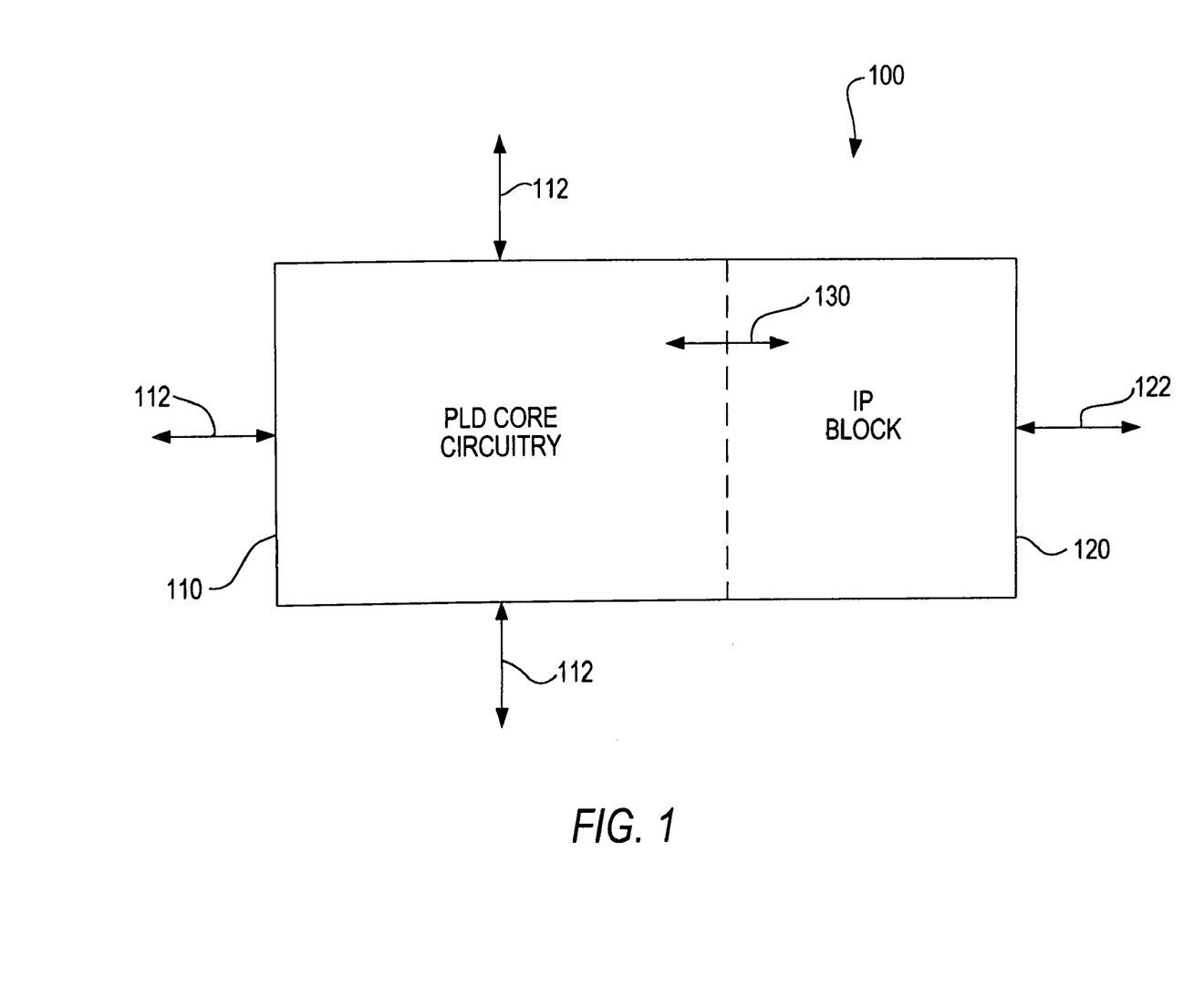
FIG. 1 is a simplified block diagram of an illustrative embodiment of a programmable logic device.

An illustrative programmable logic device (PLD) 100 constructed in accordance with the invention is shown in FIG. 1. PLD 100 is an integrated circuit that includes PLD core circuitry 110 and an intellectual property (IP) block 120. PLD core circuitry 110 can be typical programmable logic circuitry of any of several known types and constructions. IP block 120 can be a soft IP block in which circuitry is programmed in as programmable logic. Circuitry is described in terms of gates and interconnections for the gates using a netlist or a hardware description language (e.g., Very High Speed Integrated Circuit Hardware Description Language (VHDL) or Verilog), which can be synthesized with the surrounding logic. In another embodiment, IP block 120 can be a hard IP block in which circuitry is custom-designed in hardware. In yet another embodiment, IP block 120 can be a firm IP block in which circuitry is partly designed in hardware but is configurable for various applications.

Although the invention is described herein primarily in the context of a PLD, the invention can also be implemented on any suitable device such as, for example, an application-specific standard product (ASSP), an application-specific integrated circuit (ASIC), a full-custom chip, or a dedicated chip.

In accordance with the invention, IP block 120 is configured to support, for example, a multi-channel communications protocol such as high speed serial interface (HSSI) circuitry. The HSSI circuitry is used to receive one or more high speed serial (HSS) signals via connection(s) 122 and to pass the information thus received on to PLD core circuitry 110 in a form that is more readily usable by the core circuitry. Alternatively or additionally, IP block 120 may be used to output via connection(s) 122 one or more signals indicative of information received from PLD core circuitry 110. Leads 130 are used to convey signals between PLD core circuitry 110 and IP block 120. PLD core circuitry 110 may also input and/or output other, typically non-IP block, signals via leads 112.

For clarity, the invention is described primarily in the context of IP block 120 having HSSI circuitry. The principles of this invention are applicable to many HSSI communication standards that employ conventional eight-bit ten-bit (8B10B) coding. (For information regarding 8B10B coding, see Franaszek et al. U.S. Pat. No. 4,486,739). The HSSI standards that the illustrative circuitry shown herein support include, for example, the standards known as Serial Rapid I/O, PCI-Express, Fibre Channel, and many non-industry-standard protocols that are modifications of the true industry-standard protocols. Some users may sometimes want to devise and employ such variants of industry standards, and many such variants can be supported by the circuitry of this invention. The circuitry may also be supported on the physical layer (PHY) rather than the HSSI standards. For some standards, the HSSI circuitry may be fully implementable in IP block 120. For other standards, part of the interface may be implemented in IP block 120 and part of the interface may be implemented in PLD core circuitry 110.

Figure 2:
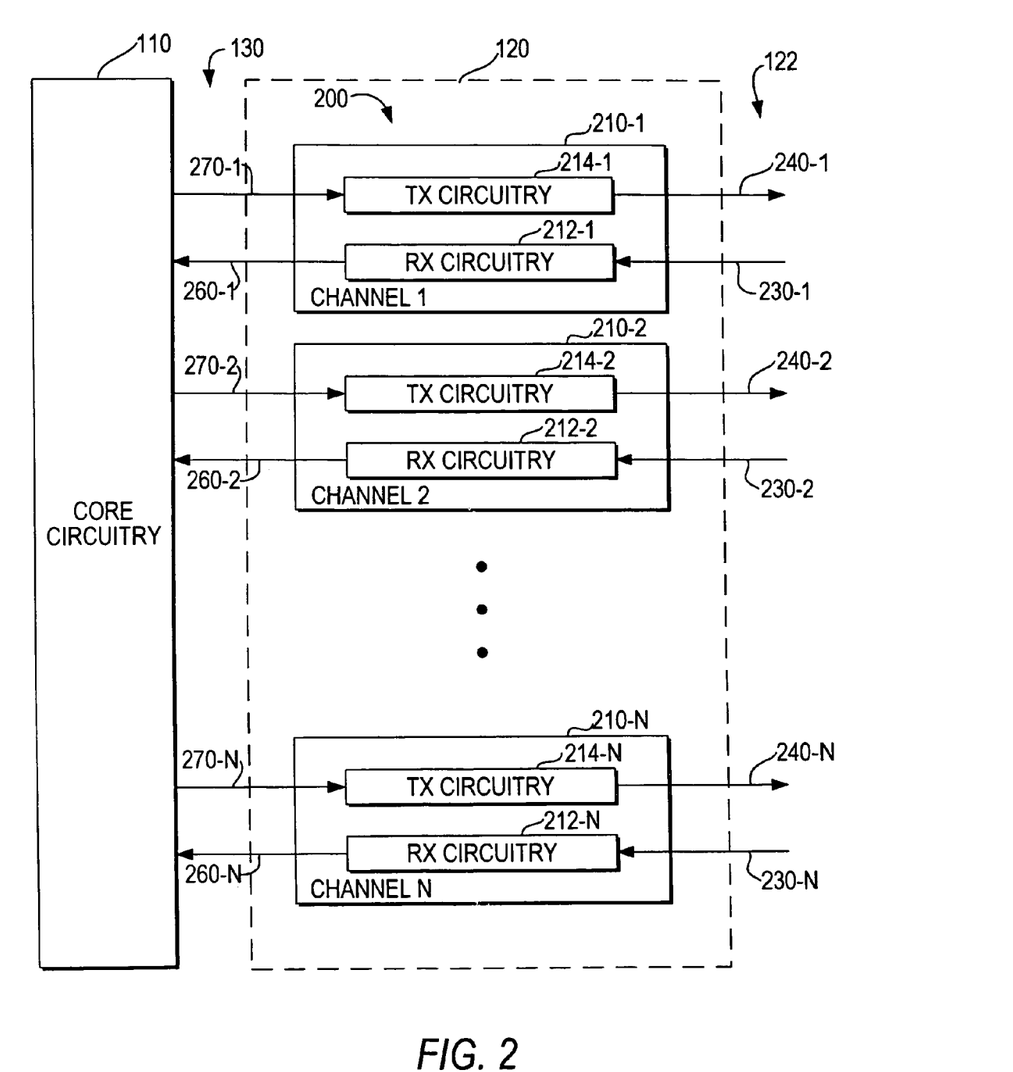
FIG. 2 is a more detailed, but still simplified block diagram of a representative portion of the programmable logic device shown in FIG. 1.

FIG. 2 shows a partial block diagram of PLD 100 having HSSI circuitry 200 in IP block 120. HSSI circuitry 200 includes up to N channels 210. The number of channels N may vary depending on the HSSI standard. In accordance with the invention, each channel 210 can operate at up to 6.5 gigabits per second (Gbps). Each channel 210 includes receiver circuitry 212 and transmitter circuitry 214.

Each receiver circuitry 212 receives data from external circuitry via associated receiver (RX) signal 230 and partly converts the received data to a form more suitable for application to PLD core circuitry 110 via leads 260. For example, each receiver circuitry 212 can receive from external circuitry successive serial bytes of ten bits each (because of 8B/10B encoding), and can output to PLD core circuitry 110 successive parallel bytes of eight bits each.

Each transmitter circuitry 214 receives data from PLD core circuitry 110 via associated lead 270 and partly converts the received data to a form more suitable for application to external circuitry via transmitter signals 240. For example, each transmitter circuitry 214 can receive from PLD core circuitry 110 successive parallel bytes of eight bits each, and can output to external circuitry successive serial bytes of ten bits each.

Although not shown, each data channel 210 receives and/or outputs one data stream via associated drivers. To avoid overcomplicating the drawing, the data streams are shown as being sent over receiver signals 230 and transmitter signals 240. Each driver can be a differential driver because the HSSI standards of interest in connection with the present illustrative embodiment receive and transmit information using differential signaling. Each receiver driver has an associated pair of input pins and each transmitter driver has an associated pair of output pins that couple to receiver circuitry 212 and transmitter circuitry 214, respectively. Receiver circuitry 212 may include, for example, first-in first-out (FIFO) circuits, deserializers, 8B10B decoders, and byte alignment circuitry. Transmitter circuitry 214 may include, for example, FIFO circuits, serializers, and 8B10B encoders.

Figure 3:
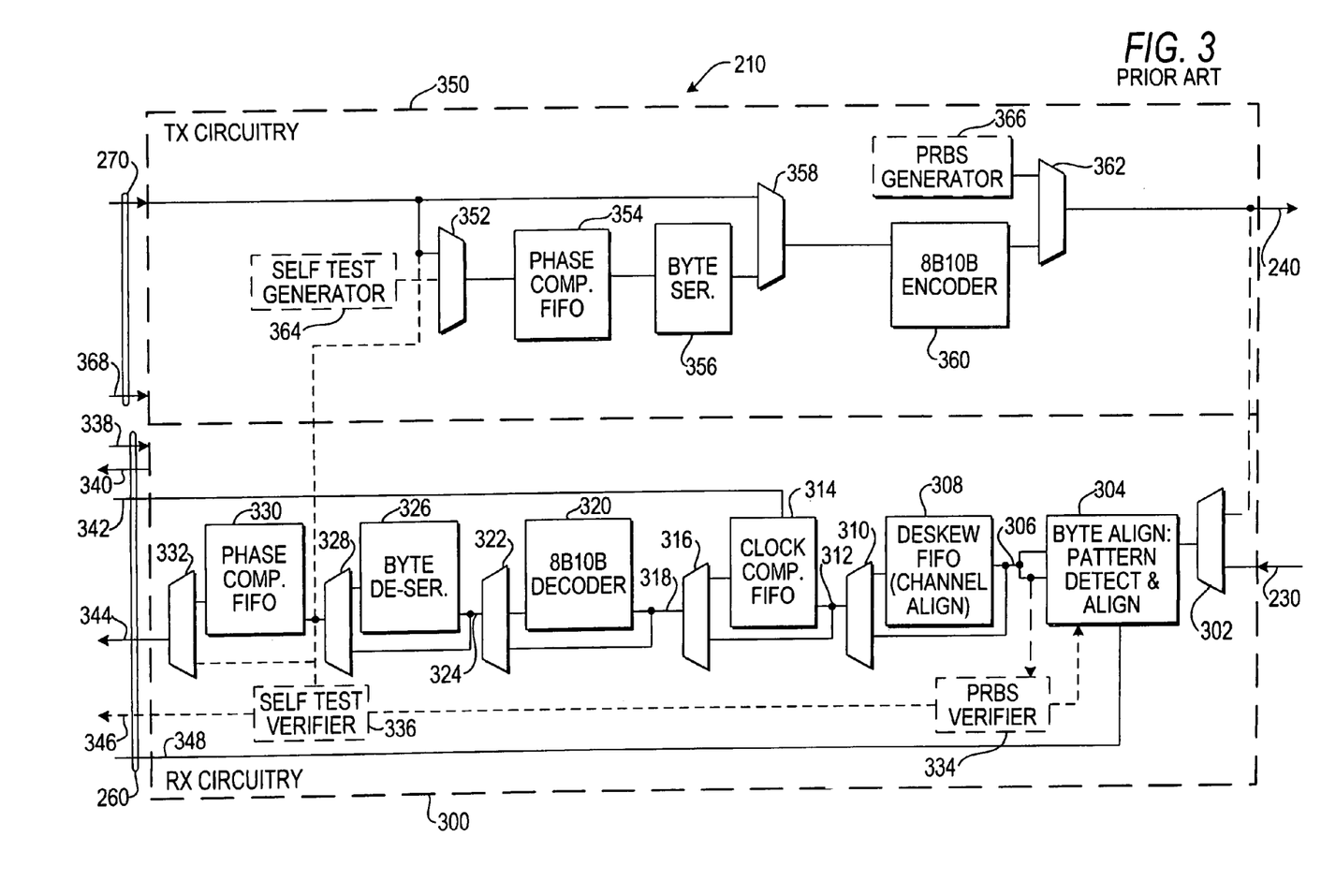
FIG. 3 is a simplified block diagram of transmitter and receiver circuitry in a representative portion of the circuitry shown in FIG. 2.

FIG. 3 is a more detailed block diagram of a channel 210 in HSSI circuitry 200. Channel 210 includes receiver circuitry 300 and transmitter circuitry 350.

Receiver circuitry 300 includes byte alignment circuitry 304, a deskew FIFO buffer 308, a clock compensation FIFO 314, an 8B10B decoder 320, a byte deserializer 326, a phase compensation FIFO 330, and multiplexers 302, 310, 316, 322, 328, and 332. Receiver circuitry 300 receives as input a serial data signal 230 from external circuitry, a PLD receiver clock signal 338 from PLD core circuitry 110 and control signals 342 and 348 also from PLD core circuitry 110. Receiver circuitry 300 sends as output a parallel data signal 344, a receiver clock signal 340, and status signals 342 and 348 to PLD core circuitry 110.

Byte alignment circuitry 304 receives data from external circuitry via data signal 230 and multiplexer 302. Byte alignment circuitry 304 uses pattern detecting to determine the byte or word boundaries in the incoming data stream and realigns the data to a recovered clock signal.

The byte-aligned or word-aligned data is sent along path 306 to deskew FIFO 308 and multiplexer 310. Deskew FIFO 308 stores the byte-aligned or word-aligned data and provides channel alignment by removing the skew of incoming data among the different channels. Such skew may be caused by, for example, transmission line length, temperature, or manufacturing (i.e., process parameters) variations among the data reception channels. The channel aligned data is sent to multiplexer 310.

Multiplexer 310 can be configured to send as output data from byte alignment circuitry 304 or deskew FIFO 308. For example, channel alignment functionality may not be desired when the HSSI reception path is configured to use only a single channel to receive data samples. In this case, multiplexer 310 sends as output data from byte alignment circuitry 304.

The output of multiplexer 310 is sent along path 312 to clock compensation FIFO 314 and multiplexer 316. Clock compensation FIFO 314 also receives as input FIFO control signals from path 342. Clock compensation FIFO 314 adjusts the frequency at which data is sent as output in order to compensate for any difference in frequency between the clock of the source from which the data originated and the clock of the device that will use the received data (e.g., a clock for the PLD core circuitry associated with the HSSI circuitry). The clock compensated data is sent as input to multiplexer 316. Clock compensation FIFO 314 may also generate status signals along path 342 for output to PLD core circuitry 110.

Multiplexer 316 can be configured to send as output data from multiplexer 310 or clock compensation FIFO 314. The output of multiplexer 316 is sent along path 318 to 8B10B decoder 320 and multiplexer 322. 8B10B decoder converts the data from ten-bit-byte form to eight-bit-byte form. The decoded data is sent as input to multiplexer 322.

Multiplexer 322 can be configured to send as output data from multiplexer 316 or 8B10B decoder 320. The output of multiplexer 322 is sent along path 324 to byte deserializer 326 and multiplexer 328. Byte deserializer 326 accumulates successive bytes of data and outputs the data in parallel. The parallel data is sent as input to multiplexer 328.

Multiplexer 328 can be configured to send as output data from multiplexer 322 or byte deserializer 326. The output of multiplexer 328 is sent to phase compensation FIFO 330. Phase compensation FIFO 330 adjusts the phase at which data is sent as output in order to compensate for any difference in phase between the clock of the source from which the data originated and the clock of the device that will use the received data (e.g., a clock for the PLD core circuitry associated with the HSSI circuitry). The phase compensated data is sent as input to multiplexer 332.

Multiplexer 332 can be configured to send as output data from phase compensation FIFO 330 along path 344 to PLD core circuitry 110.

Transmitter circuitry 350 includes a phase compensation FIFO 354, a byte serializer 356, an 8B10B encoder 360, and multiplexers 352, 358, and 362. Transmitter circuitry 350 receives as input a parallel data signal 270 and a transmitter clock signal 368 from PLD core circuitry 110. Transmitter circuitry 350 sends as output a serial data signal 240 to external circuitry.

Phase compensation FIFO 354 receives data signal 270 via multiplexer 352. Phase compensation FIFO 354 adjusts the phase at which data is sent as output in order to compensate for any difference in phase between the clock of the source from which the data originated (e.g., a clock for the PLD core circuitry associated with the HSSI circuitry) and a clock of the device that will use the received data.

The phase compensated data is sent as input to byte serializer 356. Byte serializer 356 receives data bytes in parallel and outputs those bytes one after another in succession. The byte serialized data is sent as input to multiplexer 358.

Multiplexer 358 can be configured to send as output data from PLD core circuitry 110 (via data signal 270) or byte serializer 356. The output of multiplexer 358 is sent as input to 8B10B encoder 360. 8B10B encoder 360 converts the data from eight-bit-byte form to ten-bit-byte form. The encoded data is sent as input to multiplexer 362 for output along path 240 to external circuitry.

Receiver circuitry 300 and transmitter circuitry 350 also include other elements to facilitate testing of various aspects of the circuitry. These elements include a pseudo-random bit sequence (PRBS) verifier 334, a self test verifier 336, a self test generator 364, and a PRBS generator 366. Testing data signals 346 are sent to PLD core circuitry 110.

In accordance with the invention, HSSI circuitry 200 includes N channels 210 that can each support data rates up to 6.5 Gbps. This is achieved by implementing HSSI circuitry 200 in hard IP. Each receiver circuitry can include circuitry to support two 8B10B decoders. The receiver circuitry can also include ten-bit byte alignment circuitry as well as twenty-bit byte alignment circuitry. Each transmitter circuitry can include circuitry to support two 8B10B encoders. Control signals can be provided (e.g., using dynamic or static configuration random access memory) to allow the receiver and/or transmitter circuitry to be configured to process the data. The two 8B10B decoders and encoders can be coupled in such a way as to allow the respective receiver and transmitter circuitry to be configured to operate in one of three modes of operation: cascade mode, dual channel mode, and single channel mode.

Each channel can support data rates greater than 3.125 Gbps and up to 6.5 Gbps using the cascade mode or dual channel mode. In the cascade mode, the output of each decoder or encoder is sent as input to the other decoder or encoder, allowing the data signals to interact with each other. In this mode, the characteristics of 8B10B coding, including DC balance and run length, are maintained. In the dual channel mode, each decoder or encoder processes data signals independently of the other decoder or encoder. In this mode, some of the characteristics of 8B10B coding, including, run length, are not maintained.

Each channel can support data rates less than or equal to 3.125 Gbps using the single channel mode. In the single channel mode, only one decoder or encoder is used. In this mode, the receiver and transmitter circuitry function similar to that described in connection with FIG. 3. The characteristics of 8B10B coding, including DC balance and run length, are maintained.

Figure 4:
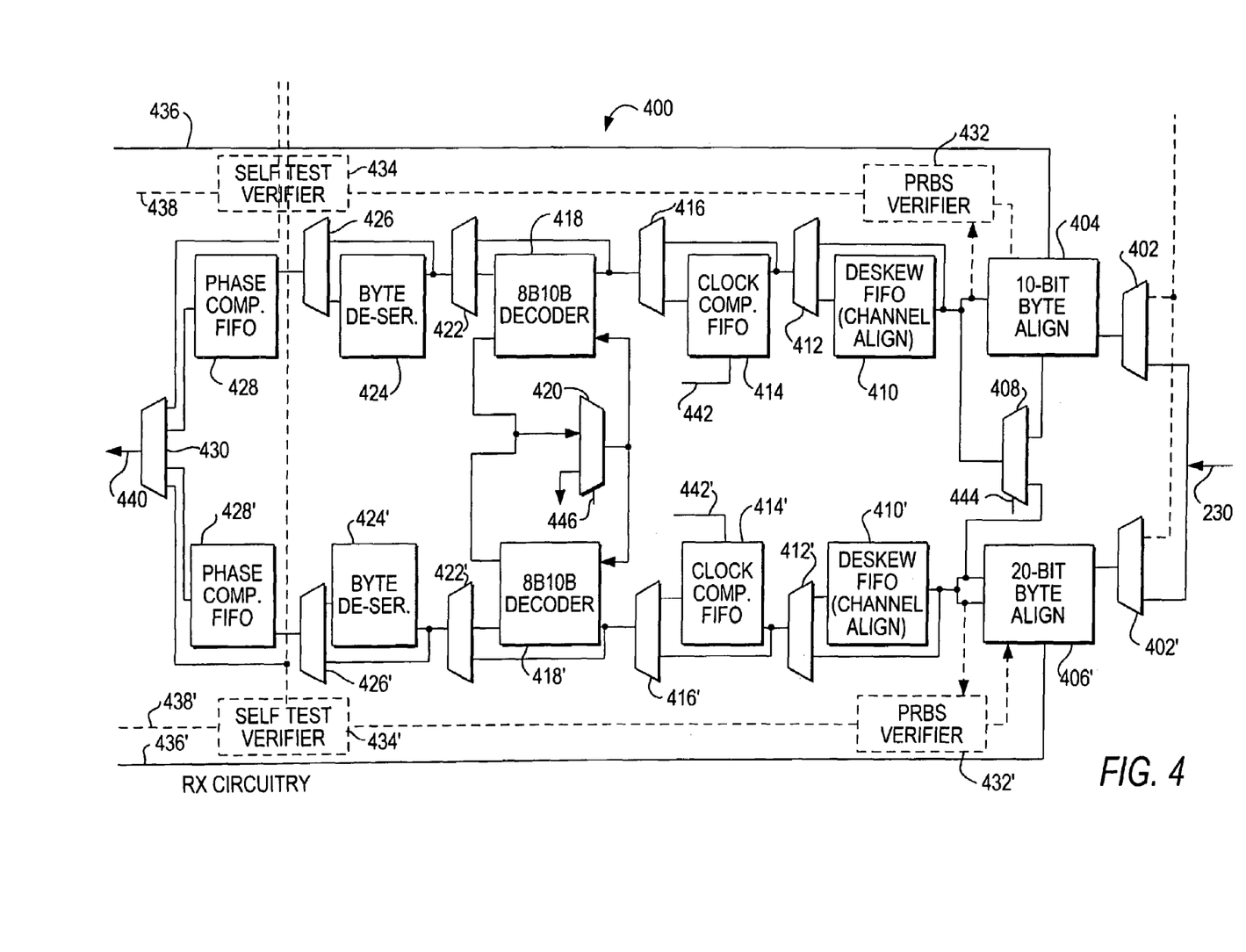
FIG. 4 is a simplified block diagram of receiver circuitry in a representative portion of the circuitry shown in FIG. 2 in accordance with the invention.

FIG. 4 illustrates receiver circuitry 400 in accordance with the invention. Receiver circuitry 400 includes ten-bit byte alignment circuitry 404, twenty-bit byte alignment circuitry 406, deskew FIFOs 410/410', clock compensation FIFOs 414/414', 8B10B decoders 418/418', byte deserializers 424/424', phase compensation FIFOs 428/428', and multiplexers 402/402', 408, 412/412', 416/416', 420, 422/422', 426/426', and 430. Receiver circuitry 400 also includes other components to facilitate testing of various aspects of the circuitry, including PRBS verifiers 432/432' and self test verifiers 434/434'.

Receiver circuitry 400 receives as input a serial data signal 230 from external circuitry, a PLD receiver clock signal (not shown) from PLD core circuitry 110, and control signals 436/436', 442/442', 444, and 446 also from PLD core circuitry 110. Receiver circuitry 400 sends as output a parallel data signal 440, a receiver clock signal (not shown), status signals 436/436' and 442/442', and testing data signals 438/438' to PLD core circuitry 110.

Byte alignment circuitry 404 and 406 can receive data from signal 230 via respective multiplexers 402/402'. For data rates less than or equal to 3.125 Gbps, data signal 230 is sent as input to byte alignment circuitry 404 via multiplexer 402. Byte-alignment circuitry 404 aligns the incoming data stream along ten-bit byte boundaries. The ten-bit byte-aligned data is sent to deskew FIFO 410, and multiplexer 412, via multiplexer 408. For data rates greater than 3.125 Gbps and up to 6.5 Gbps, data signal 230 is sent as input to byte alignment circuitry 406 via multiplexer 402'. Byte-alignment circuitry 406 aligns the incoming data stream along twenty-bit byte boundaries. The twenty-bit byte-aligned data is divided into two ten-bit bytes. The ten most significant bits are sent to deskew FIFO 410, and multiplexer 412, via multiplexer 408. The ten least significant bits are sent to deskew FIFO 410' and multiplexer 412'. Multiplexer 408 can be configured to send as output data from byte alignment circuitry 404 or 406 depending on the data rate of the incoming data signal 230 using control signal 444.

Data from byte alignment circuitry 404 and 406 may be processed in respective deskew FIFOs 410/410' or bypassed to respective multiplexers 412/412'. The output of multiplexers 412/412' may be processed in respective clock compensation FIFOs 414/414' or bypassed to respective multiplexers 416/416'. The output of multiplexers 416/416' may be processed in respective 8B10B decoders 418/418' or bypassed to respective multiplexers 422/422'.

Each 8B10B decoder 418/418' converts the data from ten-bit-byte form to eight-bit-byte form. The output of each decoder 418/418' may be sent to a respective multiplexer 422/422'. Alternatively, the output of one or both decoders 418/418' may be sent as input to the other of decoders 418'/418 via multiplexer 420 for further processing. Multiplexer 420 can be configured to send as output data from 8B10B decoders 418/418' using control signal 446.

The output of multiplexers 422/422' may be processed in respective byte deserializers 424/424' or bypassed to respective multiplexers 426/426'. The output of multiplexers 426/426' is processed in respective phase compensation FIFOs 428/428'. The phase compensated data are sent to multiplexer 430. Multiplexer 430 can be configured to send as output data from phase compensation 428/428' along path 440 to PLD core circuitry 110.

Figure 5:
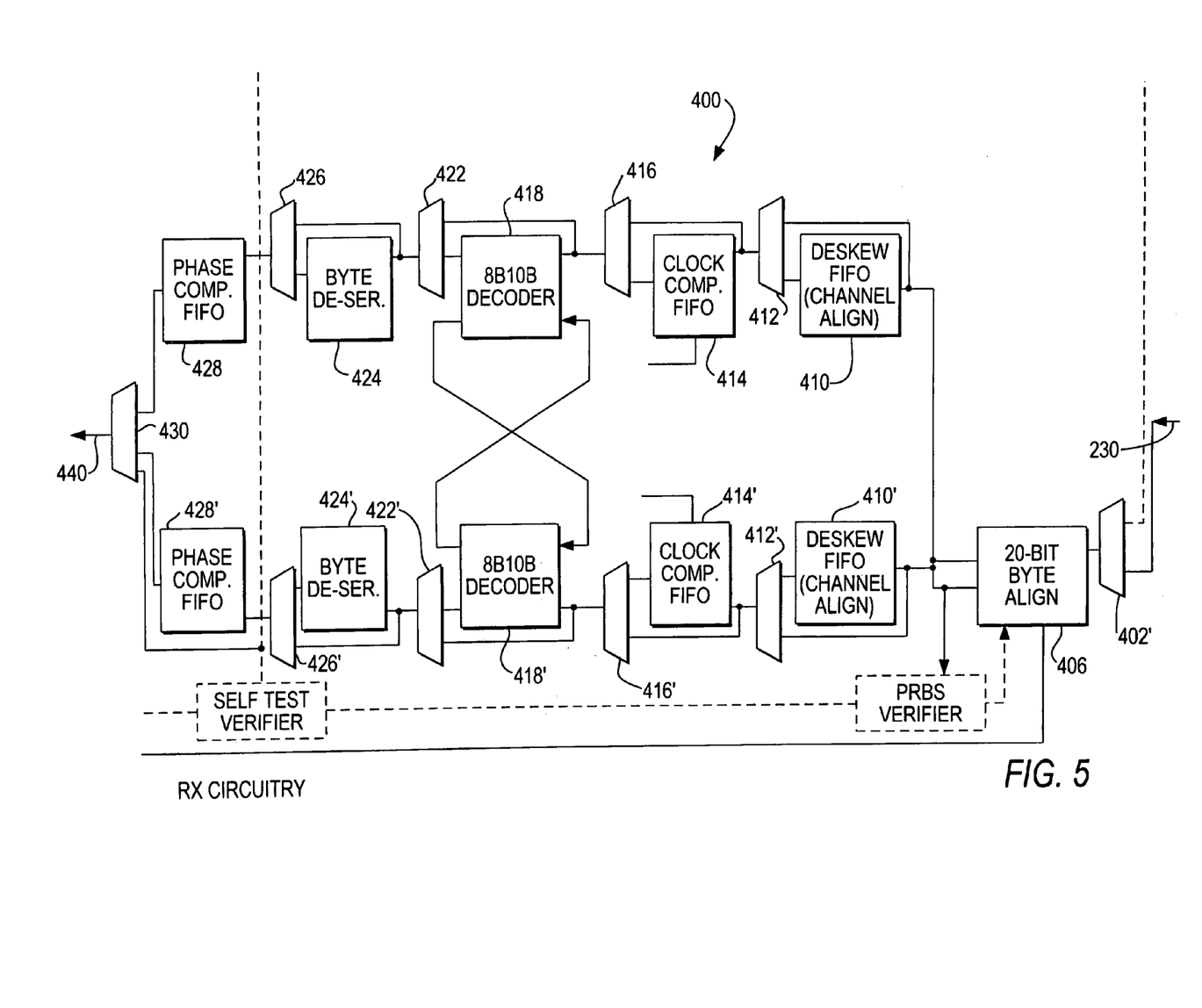
FIG. 5 is a simplified block diagram of the receiver circuitry of FIG. 4 operating in a cascade mode in accordance with the invention.

FIG. 5 illustrates the components of receiver circuitry 400 used during the cascade mode of operation for data rates greater than 3.125 Gbps and up to 6.5 Gbps. The cascade mode of operation can be used when the two ten-bit data signals in the different processing paths need to interact with each other. Data from signal 230 is sent as input to twenty-bit byte alignment circuitry 406 via multiplexer 402'. The ten most significant bits of the twenty-bit byte-aligned data are sent to deskew FIFO 410, and multiplexer 412, via multiplexer 408 (not shown) for further processing in the top half of the receiver circuitry as described in connection with FIG. 4. The ten least significant bits of the twenty-bit byte-aligned data are sent to deskew FIFO 410' and multiplexer 412' for further processing in the bottom half of the receiver circuitry as described in connection with FIG. 4.

Data that is processed in 8B10B decoder 418 can be sent as input to 8B10B decoder 418' via multiplexer 420 (not shown) while data that is processed in 8B10B decoder 418' can be sent as input to 8B10B decoder 418 via multiplexer 420 for further processing. Data from the 8B10B decoders 418/418' are then output to respective multiplexers 422/422' for further processing. The processed data is sent as output to PLD core circuitry 110 via path 440.

Figure 6:
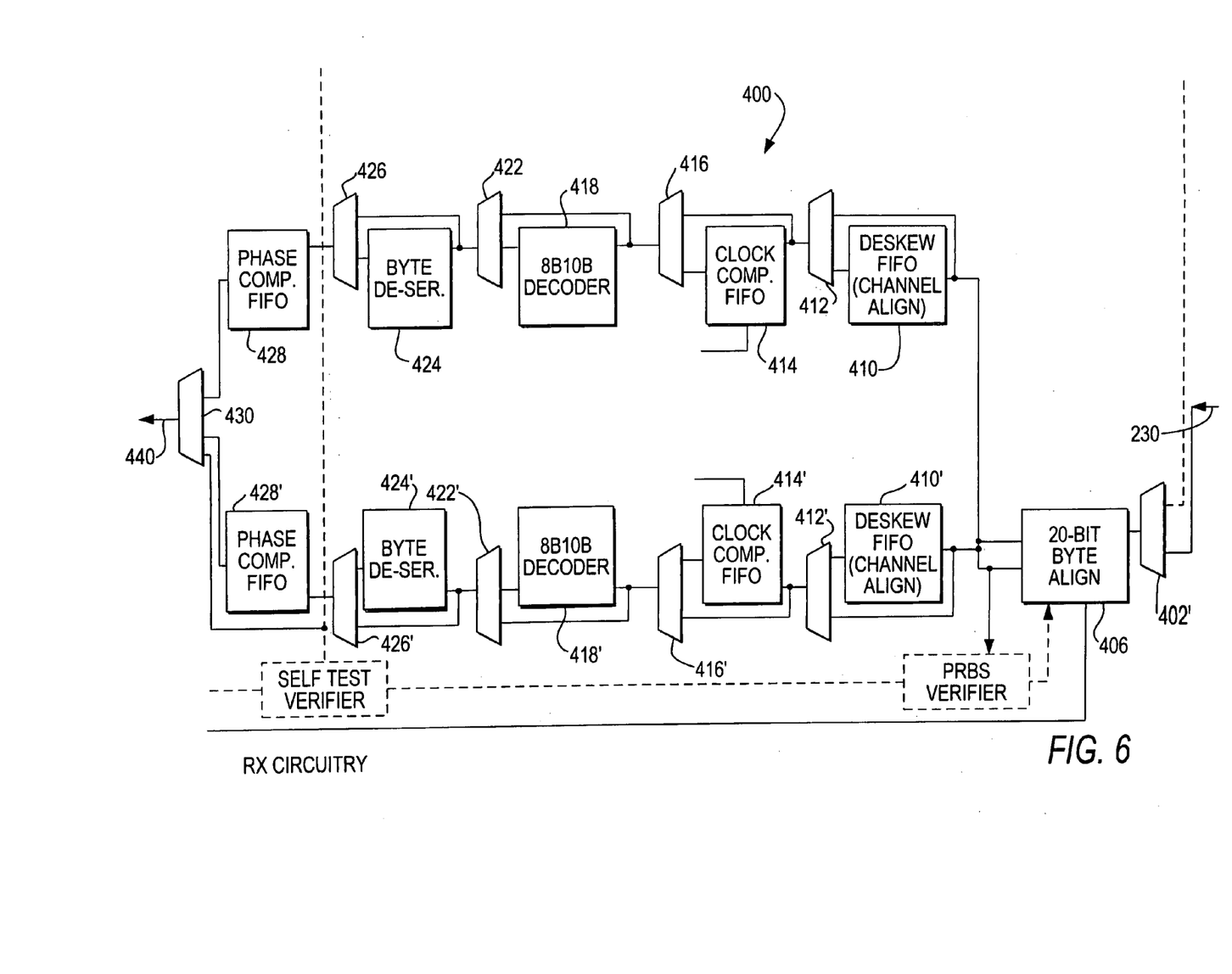
FIG. 6 is a simplified block diagram of the receiver circuitry of FIG. 4 operating in a dual channel mode in accordance with the invention.

FIG. 6 illustrates the components of receiver circuitry 400 used during the dual channel mode of operation for data rates greater than 3.125 Gbps and up to 6.5 Gbps. The dual channel mode can be used when the two ten-bit data signals are independent and do not need to interact with each other. Data from signal 230 is sent as input to twenty-bit byte alignment circuitry 406 via multiplexer 402'. The ten most significant bits of the twenty-bit byte-aligned data are sent to deskew FIFO 410, and multiplexer 412, via multiplexer 408 (not shown) for further processing in the top half of the receiver circuitry as described in connection with FIG. 4. The ten least significant bits of the twenty-bit byte-aligned data are sent to deskew FIFO 410' and multiplexer 412' for further processing in the bottom half of the receiver circuitry as described in connection with FIG. 4. Data from 8B10B decoders 418/418' are processed independently of one another. The processed data is sent as output to PLD core circuitry 110 via path 440.

Figure 7:
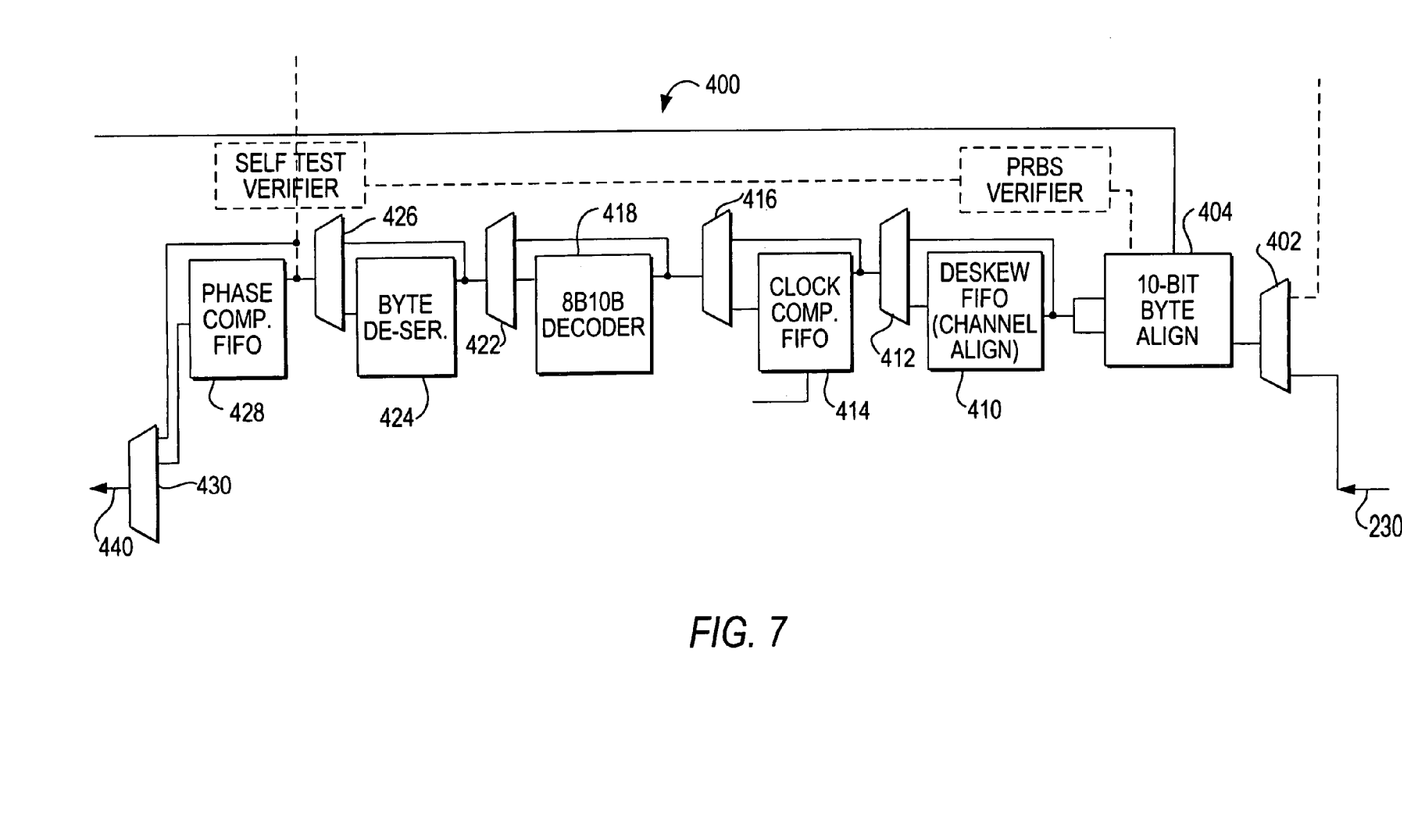
FIG. 7 is a simplified block diagram of the receiver circuitry of FIG. 4 operating in a single channel mode in accordance with the invention.

FIG. 7 illustrates the components of receiver circuitry 400 used during the single channel mode of operation for data rates less than or equal to 3.125 Gbps. Data from signal 230 is sent as input to ten-bit byte alignment circuitry 404 via multiplexer 402'. The ten-bit byte-aligned data is sent to deskew FIFO 410, and multiplexer 412, via multiplexer 408 (not shown) for further processing in the top half of the receiver circuitry as described in connection with FIG. 4. The processed data is sent as output to PLD core circuitry 110 via path 440.

Figure 8:
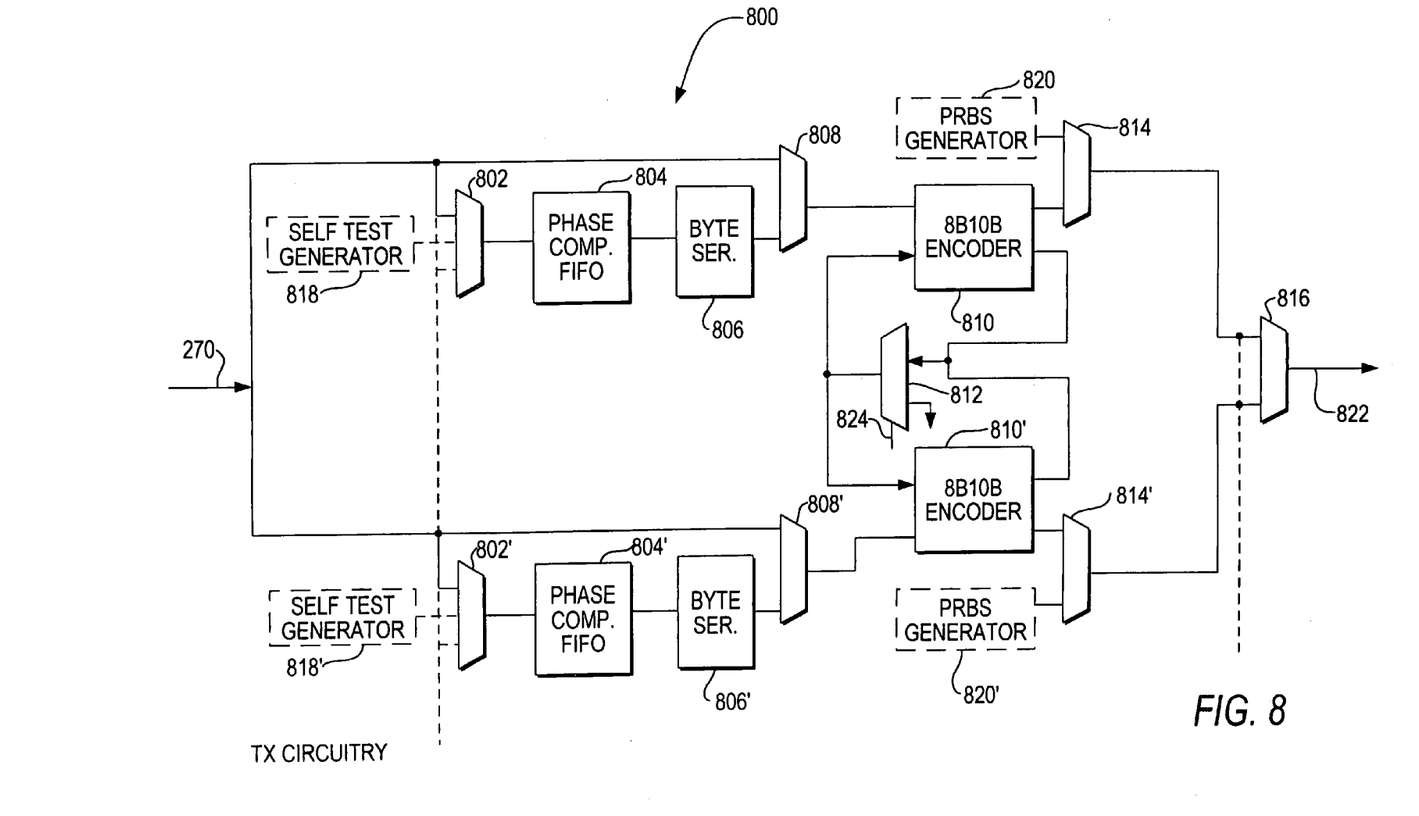
FIG. 8 is a simplified block diagram of transmitter circuitry in a representative portion of the circuitry shown in FIG. 2 in accordance with the invention.

FIG. 8 illustrates transmitter circuitry 800 in accordance with the invention. Transmitter circuitry 800 includes phase compensation FIFOs 804/804', byte serializers 806/806', 8B10B encoders 810/810', and multiplexers 802/802', 808/808', 812, 814/814', and 816. Transmitter circuitry 800 also includes other components to facilitate testing of various aspects of the circuitry, including self test generators 818/818' and PRBS generators 820/820'.

Transmitter circuitry 800 receives as input a parallel data signal 270, a transmitter clock signal (not shown), and a control signal 824 from PLD core circuitry 110. Transmitter circuitry 800 sends as output a serial data signal 822 to external circuitry.

Parallel data signal 270 is sent as inputs to phase compensation FIFOs 804/804', via respective multiplexers 802/802', and multiplexers 808/808'. For data rates less than or equal to 3.125 Gbps, data is sent along the top half of the transmitter circuitry for processing. For data rates greater than 3.125 Gbps and up to 6.5 Gbps, half of the data bits (e.g., the eight most significant bits) are sent along the top half of the transmitter circuitry for processing while the other half of the data bits (e.g., the eight least significant bits) are sent along the bottom half of the transmitter circuitry for processing.

Data from phase compensation FIFOs 804/804' are then processed in respective byte serializers 806/806'. Data from byte serializers 806/806' are sent as input to respective multiplexers 808/808'. Multiplexers 808/808' can be configured to send as output data from a respective byte serializers 86/806' or PLD core circuitry 110 via data signal 270.

The output of multiplexers 808/808' is then processed in respective 8B10B encoders 810/810'. Each 8B10B encoder 810/810' converts the data from eight-bit-byte form to ten-bit-byte form. The output of each encoder 810/810' may be sent as input to a respective multiplexer 814/814'. Alternatively, the output of one or both encoders 810/810' may be sent as input to the other of encoders 810'/810 via multiplexer 812. Multiplexer 812 can be configured to send as output data from 8B10B encoders 810/810' using control signal 824. The outputs of multiplexers 814/814' are sent as inputs to multiplexer 816 where the data is output along path 822 to external circuitry.

Figure 9:
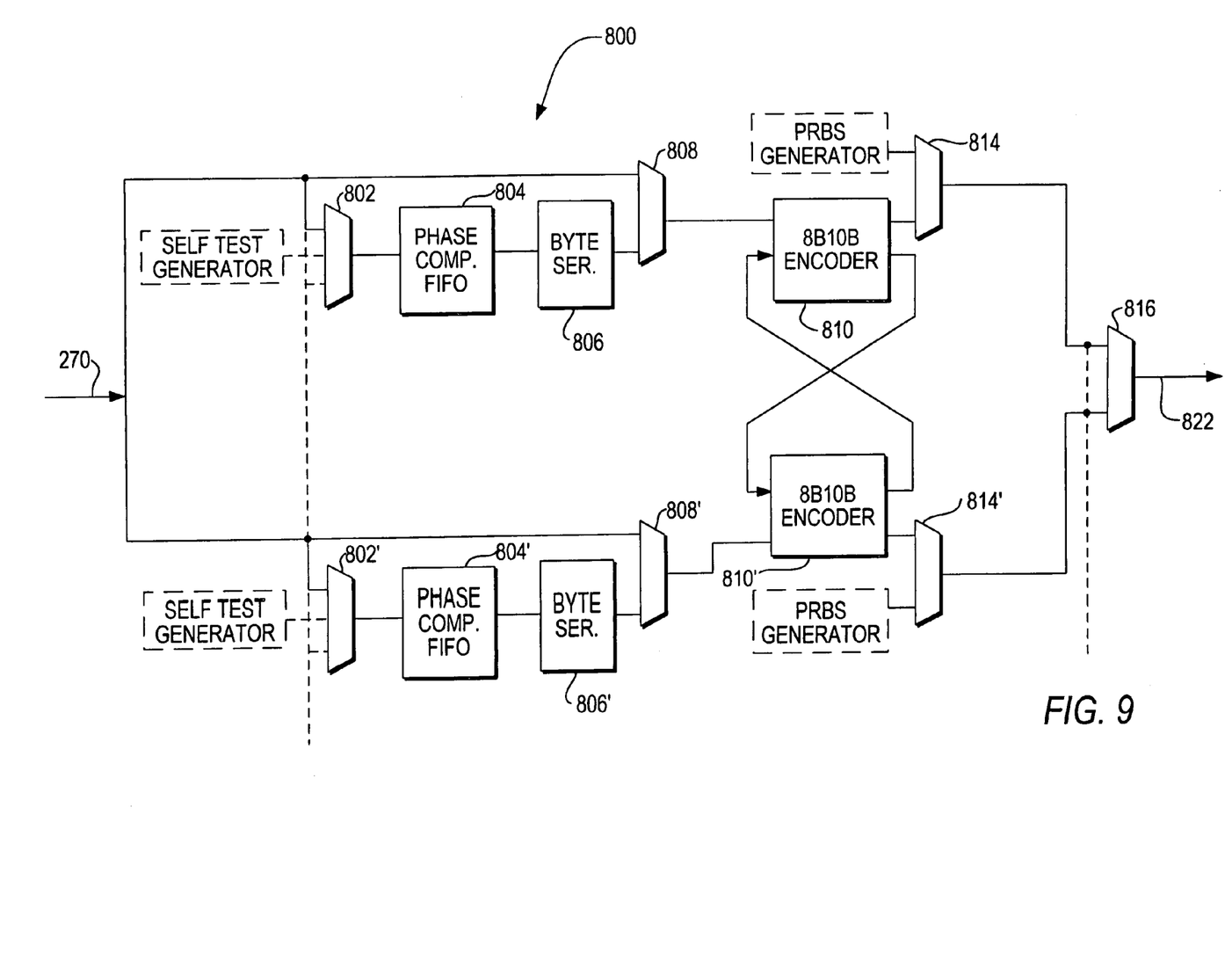
FIG. 9 is a simplified block diagram of the transmitter circuitry of FIG. 8 operating in a cascade mode in accordance with the invention.

FIG. 9 illustrates the components of transmitter circuitry 800 used during the cascade mode of operation for data rates greater than 3.125 Gbps and up to 6.5 Gbps. The cascade mode of operation can be used when the two eight-bit data signals in the different processing paths need to interact with each other. The eight most significant bits from data signal 270 are processed in the top half of the transmitter circuitry as described in connection with FIG. 8. The eight least significant bits from data signal 270 are processed in the bottom half of the transmitter circuitry as described in connection with FIG. 8.

Data that is processed in 8B10B encoder 810 can be sent as input to 8B10B encoder 810' via multiplexer 812 (not shown) while data that is processed in 8B10B encoder 810' can be sent as input to 8B10B encoder 810 via multiplexer 812 for further processing. The processed data is sent as output to external circuitry via path 822.

Figure 10:
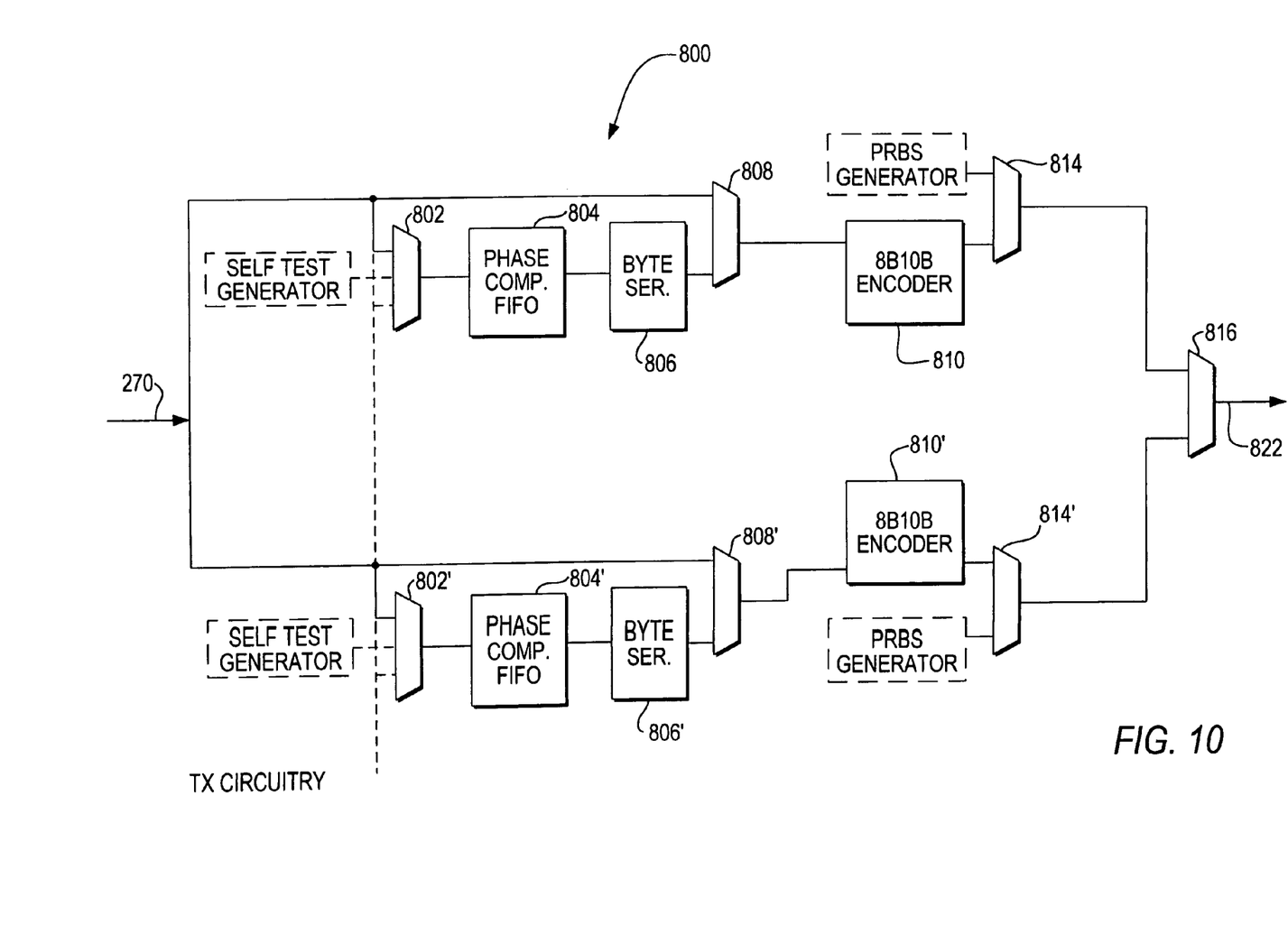
FIG. 10 is a simplified block diagram of the transmitter circuitry of FIG. 8 operating in a dual channel mode in accordance with the invention.

FIG. 10 illustrates the components of transmitter circuitry 800 used during the dual channel mode of operation for data rates greater than 3.125 Gbps and up to 6.5 Gbps. The dual channel mode can be used when the two eight-bit data signals are independent and do not need to interact with each other. The eight most significant bits from data signal 270 are processed in the top half of the transmitter circuitry as described in connection with FIG. 8. The eight least significant bits from data signal 270 are processed in the bottom half of the transmitter circuitry as described in connection with FIG. 8. Data from 8B10B encoders 810/810' are processed independently of one another. The processed data is sent as output to external circuitry via path 822.

Figure 11:
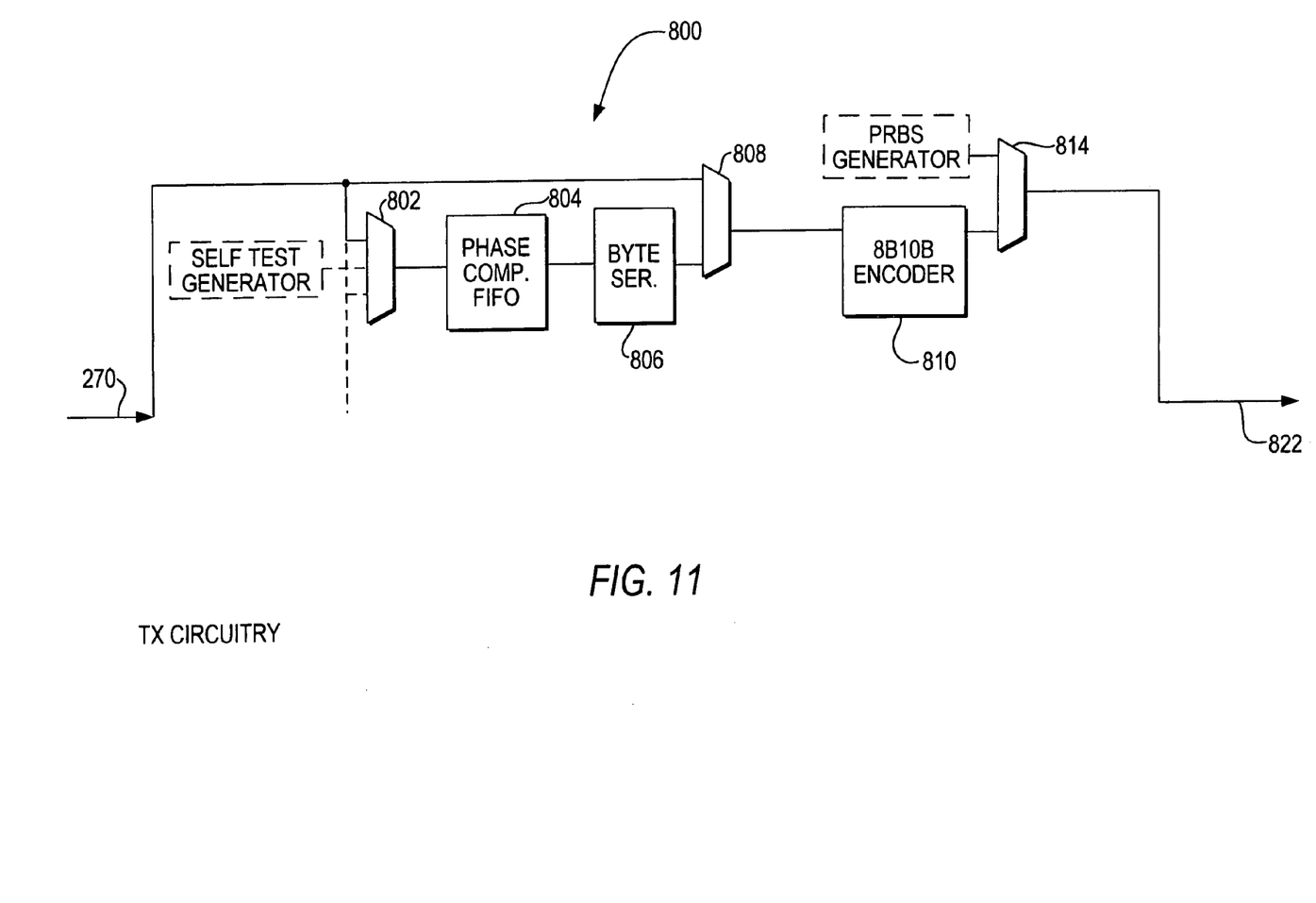
FIG. 11 is a simplified block diagram of the transmitter circuitry of FIG. 8 operating in a single channel mode in accordance with the invention.

FIG. 11 illustrates the components of transmitter circuitry 800 used during the single channel mode of operation for data rates less than or equal to 3.125 Gbps. Data from signal 270 is processed in the top half of the transmitter circuitry as described in connection with FIG. 4. The processed data is sent as output to external circuitry via path 822.

The components in the receiver circuitry and transmitter circuitry as shown in FIGS. 3-11 are merely illustrative. The receiver circuitry and transmitter circuitry may include additional components, fewer components, or a different arrangement of components. FIGS. 4-11 are shown to illustrate how the 8B10B decoders and encoders may be arranged to support data rates greater than 3.125 Gbps. Although the invention is described herein primarily in the context of HSSI circuitry supporting data rates up to 6.5 Gbps for clarity, HSSI circuitry can be provided to support even higher data rates using more than two 8B10B decoders in the receiver circuitry and two 8B10B encoders in the receiver circuitry. Additional components may be provided and the decoders and encoders can be coupled in such a way as to allow the circuitry to operate in different modes of operation in order to support an even greater range of data rates.

Figure 12:
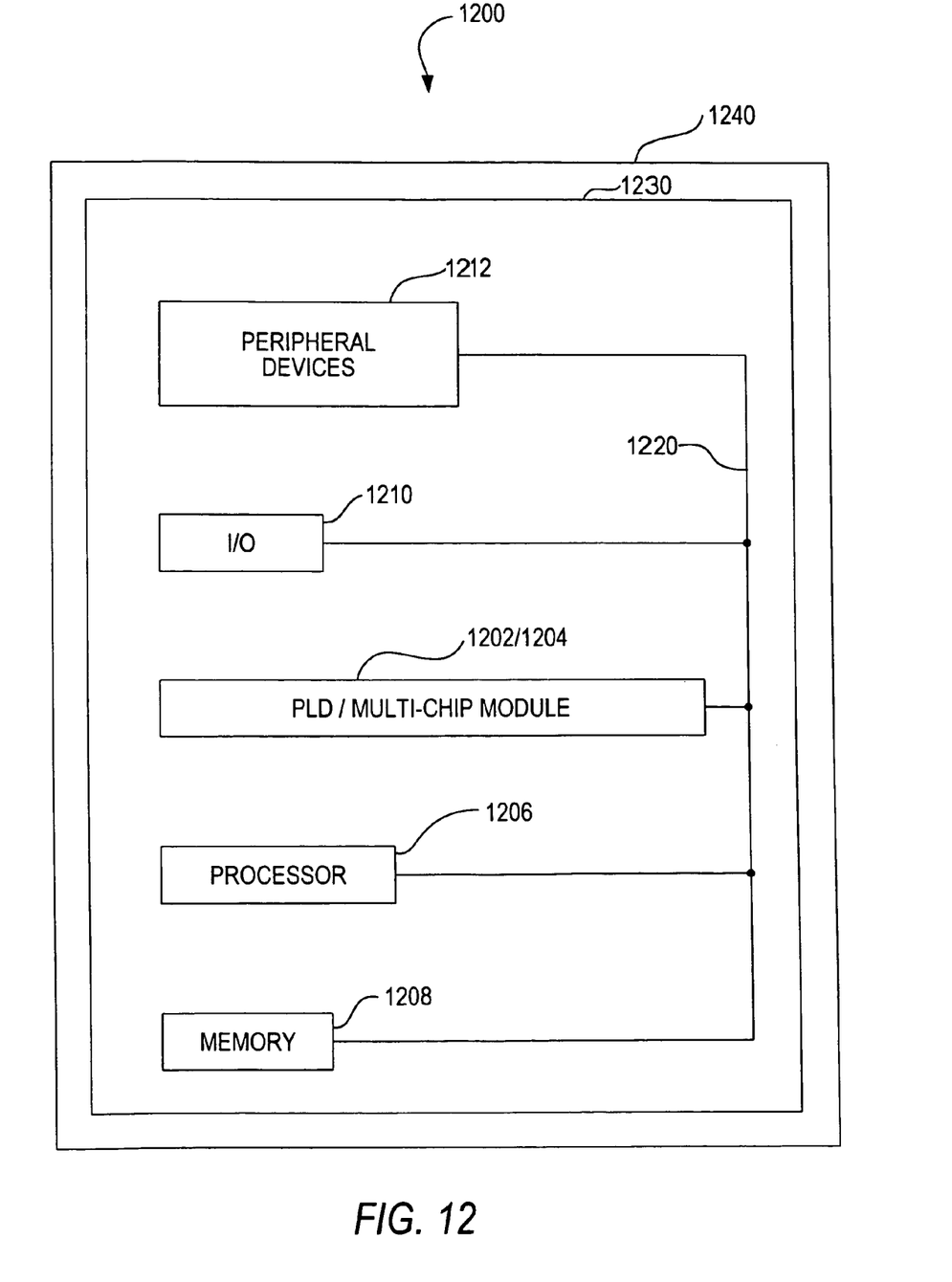
FIG. 12 is a simplified schematic block diagram of an illustrative system employing a programmable logic device, multi-chip module, or other suitable device in accordance with the invention.

FIG. 12 illustrates a PLD 1202, multi-chip module 1204, or other device (e.g., ASSP, ASIC, full-custom chip, dedicated chip) which includes embodiments of this invention in a data processing system 1200. Data processing system 1200 can include one or more of the following components: a processor 1206, memory 1208, I/O circuitry 1210, and peripheral devices 1212. These components are coupled together by a system bus or other interconnections 1220 and are populated on a circuit board 1230 which is contained in an end-user system 1240.

System 1200 can be used in a wide variety of applications, such as computer networking, data networking, instrumentation, video processing, digital signal processing, or any other application where the advantage of using programmable or reprogrammable logic is desirable. PLD/module 1202/1204 can be used to perform a variety of different logic functions. For example, PLD/module 1202/1204 can be configured as a processor or controller that works in cooperation with processor 1206. PLD/module 1202/1204 may also be used as an arbiter for arbitrating access to a shared resource in system 1200. In yet another example, PLD/module 1202/1204 can be configured as an interface between processor 1206 and one of the other components in system 1200. It should be noted that system 1200 is only exemplary, and that the true scope and spirit of the invention should be indicated by the following claims.

Various technologies can be used to implement PLDs 1202 or multi-chip modules 1204 having the features of this invention, as well as the various components of those devices (e.g., programmable logic connectors ("PLCs") and programmable function control elements ("FCEs") that control the PLCs). For example, each PLC can be a relatively simple programmable connector such as a switch or a plurality of switches for connecting any one of several inputs to an output. Alternatively, each PLC can be a somewhat more complex element that is capable of performing logic (e.g., by logically combining several of its inputs) as well as making a connection. In the latter case, for example, each PLC can be a product term logic, implementing functions such as AND, NAND, OR, or NOR. Examples of components suitable for implementing PLCs include EPROMs, EEPROMs, pass transistors, transmission gates, antifuses, laser fuses, metal optional links, etc. PLCs and other circuit components may be controlled by various, programmable, function control elements ("FCEs"). For example, FCEs can be SRAMS, DRAMS, magnetic RAMS, ferro-electric RAMS, first-in first-out ("FIFO") memories, EPROMS, EEPROMs, function control registers, ferro-electric memories, fuses, antifuses, or the like. From the various examples mentioned above it will be seen that this invention is applicable to both one-time-only programmable and reprogrammable resources.

Thus it is seen that 8B10B coding is provided in a hard IP block with the capability of supporting a greater range of data rates (e.g., data rates less than, equal to, and greater than 3.125 Gbps). One skilled in the art will appreciate that the invention can be practiced by other than the prescribed embodiments, which are presented for purposes of illustration and not of limitation, and the invention is limited only by the claims which follow.

What is claimed is:

1. Transmitter circuitry comprising:
   eight-bit-ten-bit (8B10B) encoder circuitry; and
   multiplexer circuitry coupled to the 8B10B encoder circuitry, wherein:
   the multiplexer circuitry is operable to receive at least one control signal and configure the transmitter circuitry to operate in one of a plurality of modes based on a value of the received at least one control signal, wherein the plurality of modes comprises at least two modes selected from the group consisting of: a cascade mode, a dual-channel mode, and a single-channel mode.

2. The transmitter circuitry of claim 1 wherein the 8B10B encoder circuitry comprises:
   a first 8B10B encoder coupled to the multiplexer circuitry; and
   a second 8B10B encoder coupled to the multiplexer circuitry.

3. The transmitter circuitry of claim 2 wherein:
   the first 8B10B encoder is coupled to transmit first data to the second 8B10B encoder when a first value of the at least one control signal is received by the multiplexer circuitry; and
   the second 8B10B encoder is coupled to transmit second data to the first 8B10B encoder when the first value of the at least one control signal is received by the multiplexer circuitry.

4. The transmitter circuitry of claim 2 wherein:
   the first 8B10B encoder is coupled to receive a first data stream and convert the first data stream from eight-bit-byte form to ten-bit-byte form when a first value of the at least one control signal is received by the multiplexer circuitry; and
   the second 8B10B encoder is coupled to receive a second data stream and convert the second data stream from eight-bit-byte form to ten-bit-byte form when the first value of the at least one control signal is received by the multiplexer circuitry.

5. The transmitter circuitry of claim 2 wherein:
the first 8B10B encoder is coupled to receive a first data stream and convert the first data stream from eight-bit-byte form to ten-bit-byte form when a first value of the at least one control signal is received by the multiplexer circuitry; and
the second 8B10B encoder is prevented from receiving a data stream when the first value of the at least one control signal is received by the multiplexer circuitry.

6. The transmitter circuitry of claim 1 wherein the encoder circuitry is implemented on a hard intellectual property block that is coupled to receive a first data stream from programmable logic device (PLD) core circuitry and to transmit a second data stream to external circuitry.

7. The transmitter circuitry of claim 1 wherein the multiplexer circuitry is coupled to receive the at least one control signal from configuration random access memory.

8. Receiver circuitry comprising:
eight-bit-ten-bit (8B10B) decoder circuitry; and
multiplexer circuitry coupled to the 8B10B decoder circuitry, wherein:
the multiplexer circuitry is operable to receive at least one control signal and configure the receiver circuitry to operate in one of a plurality of modes based on a value of the received at least one control signal, wherein the plurality of modes comprises at least two modes selected from the group consisting of: a cascade mode, a dual-channel mode, and a single-channel mode.

9. The receiver circuitry of claim 8 wherein the 8B10B decoder circuitry comprises:
a first 8B10B decoder coupled to the multiplexer circuitry; and
a second 8B10B decoder coupled to the multiplexer circuitry.

10. The receiver circuitry of claim 9 wherein:
the first 8B10B decoder is coupled to transmit first data to the second 8B10B decoder when a first value of the at least one control signal is received by the multiplexer circuitry; and
the second 8B10B decoder is coupled to transmit second data to the first 8B10B decoder when the first value of the at least one control signal is received by the multiplexer circuitry.

11. The receiver circuitry of claim 9 wherein:
the first 8B10B decoder is coupled to receive a first data stream and convert the first data stream from ten-bit-byte form to eight-bit-byte form when a first value of the at least one control signal is received by the multiplexer circuitry; and
the second 8B10B decoder is coupled to receive a second data stream and convert the second data stream from ten-bit-byte form to eight-bit-byte form when the first value of the at least one control signal is received by the multiplexer circuitry.

12. The receiver circuitry of claim 9 wherein:
the first 8B10B decoder is coupled to receive a first data stream and convert the first data stream from ten-bit-byte form to eight-bit-byte form when a first value of the at least one control signal is received by the multiplexer circuitry; and
the second 8B10B decoder is prevented from receiving a data stream when the first value of the at least one control signal is received by the multiplexer circuitry.

13. The receiver circuitry of claim 8 wherein the encoder circuitry is implemented on a hard intellectual property block that is coupled to receive a first data stream from external circuitry and to transmit a second data stream to programmable logic device (PLD) core circuitry.

14. The receiver circuitry of claim 8 wherein the multiplexer circuitry is coupled to receive the at least one control signal from configuration random access memory.

15. Transmitter circuitry comprising:
a first eight-bit-ten-bit (8B10B) encoder with a first input coupled to programmable logic device (PLD) core circuitry;
a second 8B10B encoder with a first input coupled to the PLD core circuitry;
first multiplexer circuitry with a first input coupled to a first output of the first 8B10B encoder and a first output of the second 8B10B encoder, a second input coupled to a source of substantially constant voltage, and an output coupled to a second input of the first 8B10B encoder and a second input of the second 8B10B encoder; and
second multiplexer circuitry with a first input coupled to a second output of the first 8B10B encoder and a second input coupled to a second output of the second 8B10B encoder.

16. The transmitter circuitry of claim 15 wherein:
the first 8B10B encoder is coupled to receive half of a set of data bits received by the transmitter circuitry; and
the second 8B10B encoder is coupled to receive the other half of the set of data bits received by the transmitter circuitry.

17. The transmitter circuitry of claim 15 wherein at least one of the first and second multiplexer circuitries is coupled to receive at least one control signal from configuration random access memory.

18. Receiver circuitry comprising:
first byte alignment circuitry operable to receive first data and align the first data to a ten-bit byte boundary;
second byte alignment circuitry operable to receive second data and align the second data to a twenty-bit byte boundary;
first multiplexer circuitry with a first input coupled to an output of the first byte alignment circuitry and a second input coupled to an output of the second byte alignment circuitry;
a first eight-bit-ten-bit (8B10B) decoder with a first input coupled to an output of the first multiplexer and a first output coupled to programmable logic device (PLD) core circuitry;
a second 8B10B decoder with a first input coupled to the output of the second byte alignment circuitry and a first output coupled to the PLD core circuitry; and
second multiplexer circuitry with a first input coupled to a second output of the first 8B10B decoder and a second output of the second 8B10B decoder, a second input coupled to a source of substantially constant voltage, and an output coupled to a second input of the first 8B10B decoder and a second input of the second 8B10B decoder.

19. The receiver circuitry of claim 18 wherein:
the first 8B10B decoder is coupled to receive half of a set of data bits received by the receiver circuitry; and
the second 8B10B decoder is coupled to receive the other half of the set of data bits received by the receiver circuitry.

20. The receiver circuitry of claim 18 wherein at least one of the first and second multiplexer circuitries is coupled to receive at least one control signal from configuration random access memory.

* * * * *